(12) United States Patent
Dange

(10) Patent No.: US 11,257,170 B2
(45) Date of Patent: Feb. 22, 2022

(54) USING THREE-DIMENSIONAL VIRTUAL OBJECT MODELS TO GUIDE USERS IN VIRTUAL ENVIRONMENTS

(71) Applicant: Meta Platforms, Inc., Menlo Park, CA (US)

(72) Inventor: Amod Ashok Dange, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/293,502

(22) Filed: Mar. 5, 2019

(65) Prior Publication Data

US 2019/0197634 A1 Jun. 27, 2019

Related U.S. Application Data

(63) Continuation of application No. 14/981,637, filed on Dec. 28, 2015, now Pat. No. 10,242,413.

(51) Int. Cl.
*G06T 19/00* (2011.01)
*G06Q 50/00* (2012.01)
*G06F 3/01* (2006.01)

(52) U.S. Cl.
CPC ............. *G06Q 50/01* (2013.01); *G06F 3/011* (2013.01); *G06T 19/00* (2013.01)

(58) Field of Classification Search
CPC ................................ G06T 19/00; G06T 19/006
See application file for complete search history.

(56) References Cited

U.S. PATENT DOCUMENTS

| | | | |
|---|---|---|---|
| 2014/0208272 A1* | 7/2014 | Vats ........................ | G06T 19/20 715/852 |
| 2014/0310056 A1* | 10/2014 | Alapati .............. | G06K 9/00671 705/7.28 |
| 2014/0375691 A1* | 12/2014 | Kasahara ................ | G06T 11/60 345/633 |
| 2016/0026253 A1* | 1/2016 | Bradski .............. | G02B 27/0172 345/8 |
| 2016/0033770 A1* | 2/2016 | Fujimaki ............... | G06T 19/006 345/8 |
| 2016/0217623 A1* | 7/2016 | Singh ..................... | G09G 3/003 |
| 2017/0169478 A1* | 6/2017 | Dey ................... | G06Q 30/0255 |

\* cited by examiner

*Primary Examiner* — Ryan McCulley
(74) *Attorney, Agent, or Firm* — Baker Botts L.L.P.

(57) ABSTRACT

In one embodiment, a method includes rendering, based on a three-dimensional model, a virtual object in a three-dimensional virtual environment, where the rendering is customized for a user of the virtual environment, the customized rendering being based on a current stage of the user in a course of stages, wherein the course comprises a plurality of stages including a first stage, a final stage, and one or more intermediate stages, each stage being associated with one or more transition conditions, wherein the course comprises at least one path through the stages from the first stage to the final stage, detecting, in the virtual environment, one or more actions by the user, updating the current stage of the user in response to the detected actions, and providing information relating to the updated current stage of the user to an interested party.

19 Claims, 9 Drawing Sheets

USING THREE-DIMENSIONAL VIRTUAL OBJECT MODELS TO GUIDE USERS IN VIRTUAL ENVIRONMENTS

PRIORITY

This application is a continuation under 35 U.S.C. § 120 of U.S. patent application Ser. No. 14/981,637, filed 28 Dec. 2015.

TECHNICAL FIELD

This disclosure generally relates to using three-dimensional virtual objects to interact with and guide users in virtual environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with wireless local area networks (WLANs) or a cellular-telephone network. Such a device may also include one or more cameras, scanners, touch-screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, three-dimensional virtual objects that represent products or services may be provided in a three-dimensional virtual environment. The virtual objects may provide information and experiences related to the products or services, and the user may view and interact with the virtual objects from various perspectives. The virtual objects may be rendered based on three-dimensional (3D) models, which may be received from a provider of the products or services. For example, the virtual objects may include a 3D rendering of a car generated based on a 3D model provided by an automobile manufacturer. In this way, the user may be made aware of the virtual objects and, depending on the user's subsequent actions, the user's knowledge of the products or services may be developed through a course of stages. For example, information about the virtual objects may be made available to the user in each stage, and the level of detail or quantity of information may be increased in each successive stage. User actions that show interest in a virtual object, such as looking at or commenting on the virtual object, may trigger advancement to the next stage, so that information is presented to the user in proportion to the user's level of interest.

In particular embodiments, the virtual object's appearance and behavior, including movement and interaction with the user in the virtual environment, may be specified by the 3D model. The virtual object's appearance, including information to provide to the user, and behavior, such as how the object moves and interacts with the user in the 3D virtual environment, may be defined by one or more sequences of control instructions. The control instructions may be provided by or in association with the 3D model, e.g., as instructions in a scripting language to be executed by a graphics rendering engine. The control instructions may implement the course of stages by providing the information and other interactions to increase the user's familiarity with the virtual object in each stage, and by advancing to the next stage when the user indicates sufficient interest in or preference for the virtual object. The course of stages may start at an initial stage, such as awareness of the object, and end at a final stage, such as acquiring, using, or purchasing a product or service related to the object. As an example and not by way of limitation, the stages may include awareness, knowledge, linking, preference for, conviction of preference for, and acquisition of the virtual object or an associated product or service.

In particular embodiments, the information and interactions may be determined, based on user input and user attributes, by control instructions associated with each stage. The conditions under which a transition to advance to the next stage occurs may be defined by a "transition condition" associated with each stage. The transition conditions may be implemented as control instructions that check for user behavior that indicates the user is ready to move to the next stage, such as actions indicating interest in the object. When the user performs the actions or otherwise satisfies the transition condition for a particular stage, a transition is made to the next stage in the course. The process may end when a final stage is reached or the user performs an operation that stops the process, such as indicating that they are not interested in the virtual object.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
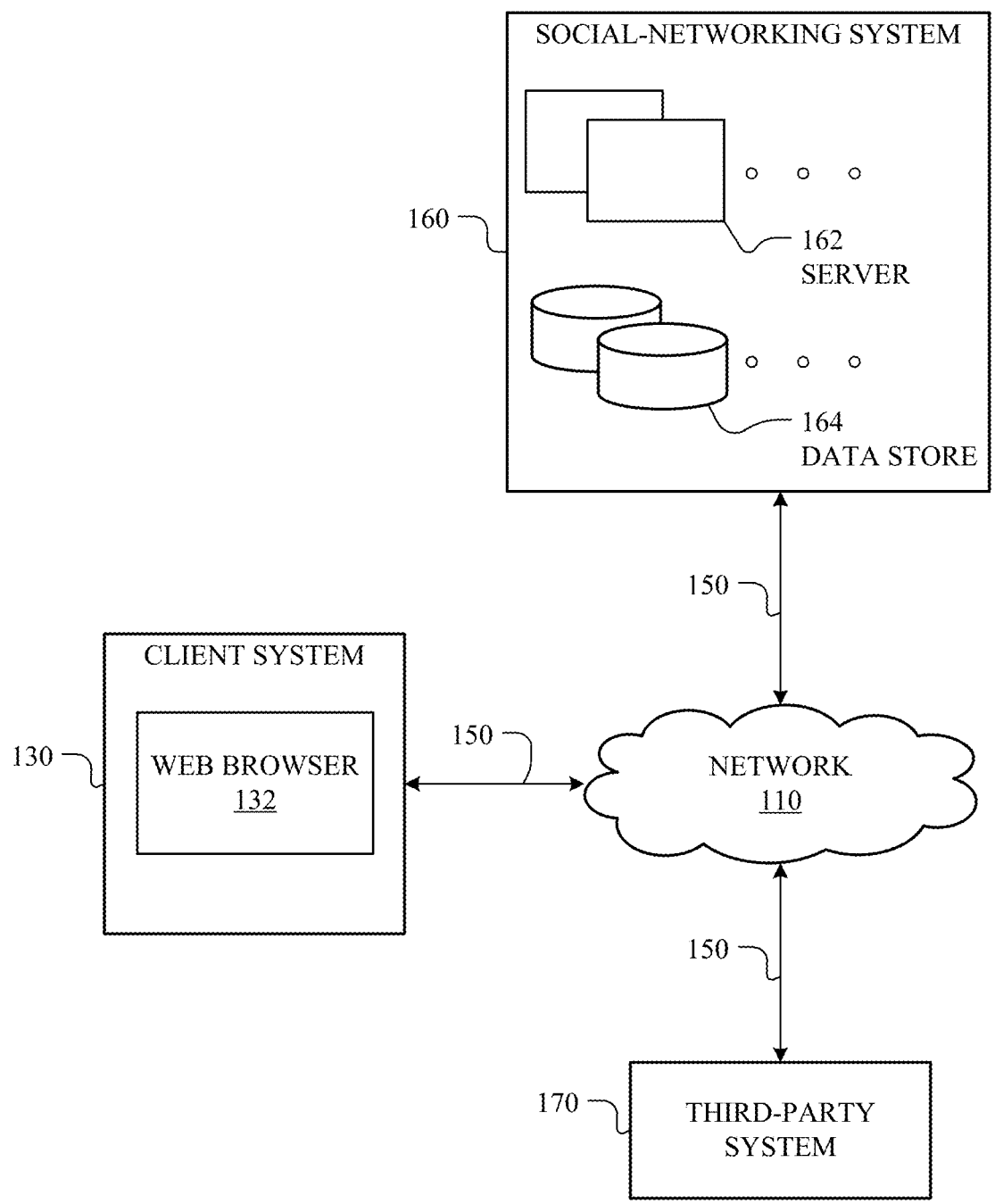
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
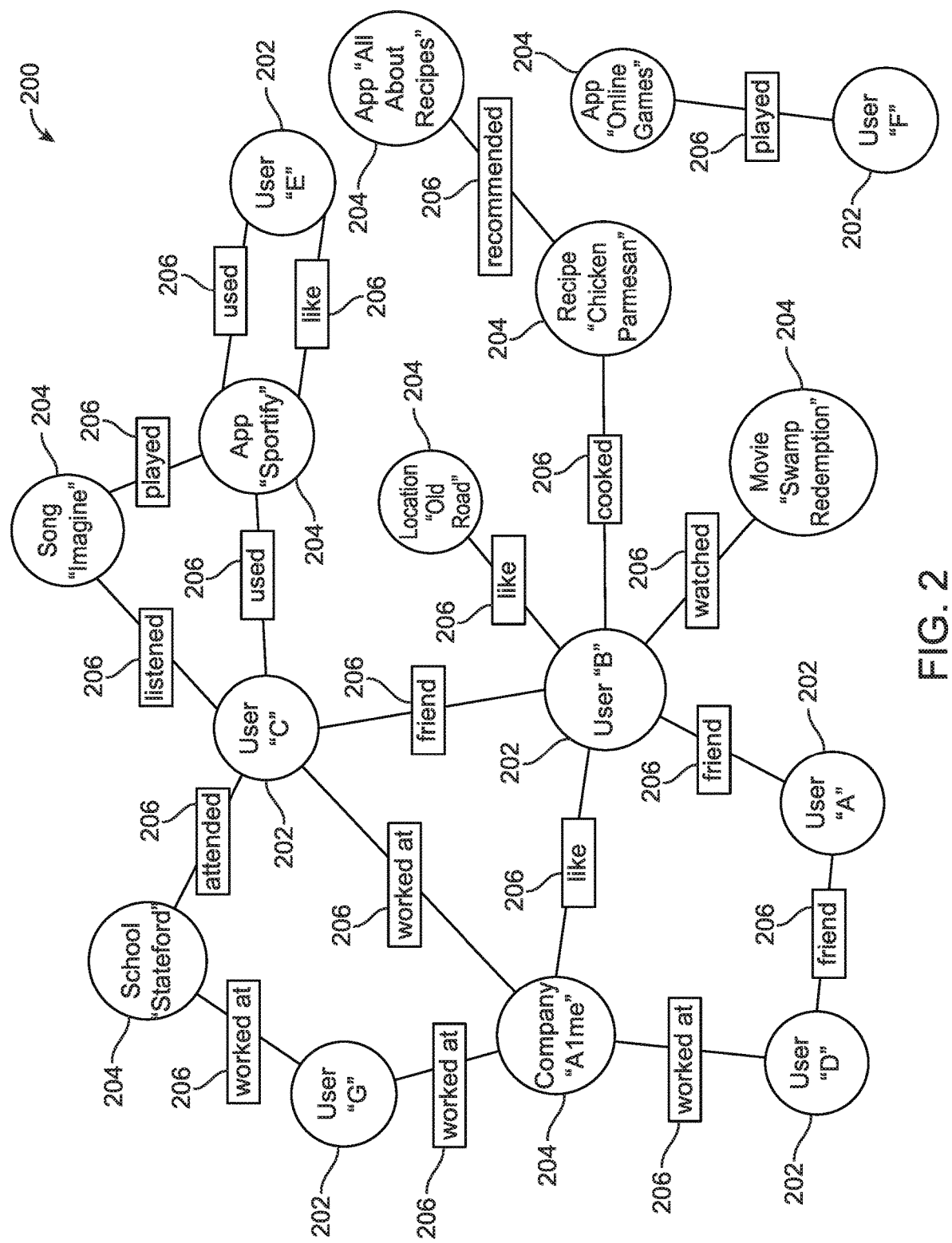
FIG. 2 illustrates an example social graph

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130)

may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising [Short Version]

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph #00, social-networking system 160 may analyze the number and/or type of edges #06 connecting particular user nodes #02 and concept nodes #04 when calculating a coefficient. As an example and not by way of limitation, user nodes #02 that are connected by a spouse-type edge (representing that the two users are married) may be assigned a higher coefficient than a user nodes #02 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph #00. As an example and not by way of limitation, social-graph entities that are closer in the social graph #00 (i.e., fewer degrees of separation) may have a higher coefficient than entities that are further apart in the social graph #00.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Rendering Virtual Objects for Users in Stages

In particular embodiments, three-dimensional virtual objects that represent products or services may be provided in a three-dimensional virtual environment. The virtual objects may provide information and experiences related to the product or service, and the user may view and interact with the virtual objects from various perspectives. The virtual objects may be rendered based on three-dimensional (3D) models, which may be received from a provider of the product or service. For example, the virtual objects may include a 3D rendering of a car generated based on a 3D model provided by an automobile manufacturer. In this way, the user may be made aware of the virtual objects and, depending on the user's subsequent actions, the user's knowledge of the product or service may be developed through a course of stages. For example, information about the virtual objects may be made available to the user in each stage, and the level of detail or quantity of information may be increased in each successive stage. User actions that show interest in a virtual object, such as looking at or commenting on the virtual object, may trigger advancement to the next stage, so that information is presented to the user in proportion to the user's level of interest.

In particular embodiments, the object's appearance and behavior, including movement and interaction with the user in the virtual environment, may be specified by the 3D model. The virtual object's appearance, including information to provide to the user, and behavior, such as how the object moves and interacts with the user in the 3D virtual environment, may be defined by one or more sequences of control instructions. The control instructions may be provided by or in association with the 3D model, e.g., as instructions in a scripting language to be executed by a graphics rendering engine. The control instructions may implement the course of stages by providing the information and other interactions to increase the user's familiarity with the virtual object in each stage, and by advancing to the next stage when the user indicates sufficient interest in or preference for the virtual object. The course of stages may start at an initial stage, such as awareness of the object, and end at a final stage, such as acquiring, using, or purchasing a product or service related to the object. As an example and not by way of limitation, the stages may include awareness, knowledge, linking, preference for, conviction of preference for, and acquisition of the virtual object or an associated product or service.

In particular embodiments, the information and interactions may be different in each stage, and may be determined, based on user input and user attributes, by control instructions associated with each stage. The conditions under which a transition to advance to the next stage occurs may be defined by a "transition condition" associated with each stage. The transition conditions may be implemented as control instructions that check for user behavior that indicates the user is ready to move to the next stage, such as actions indicating interest in the object. When the user performs the actions or otherwise satisfies the transition condition for a particular stage, a transition is made to the next stage in the course.

Starting with an initial stage, the virtual object may be rendered at each stage, according to the control instructions for the stage, until the stage's transition condition is satisfied, e.g., by a user action, at which point the virtual object may be rendered according to the instructions for the next stage until that stage's transition condition is satisfied, and so on. The process may end when a final stage is reached or the user performs an operation that stops the process, such as indicating that they are not interested in the virtual object. The control instructions that provide the object's behavior, the stages, and the transition conditions associated with the stages may be defined by the 3D model, e.g., as script code for a 3D graphics rendering engine, or any other type of instructions to be processed in the virtual environment.

Figure 3:
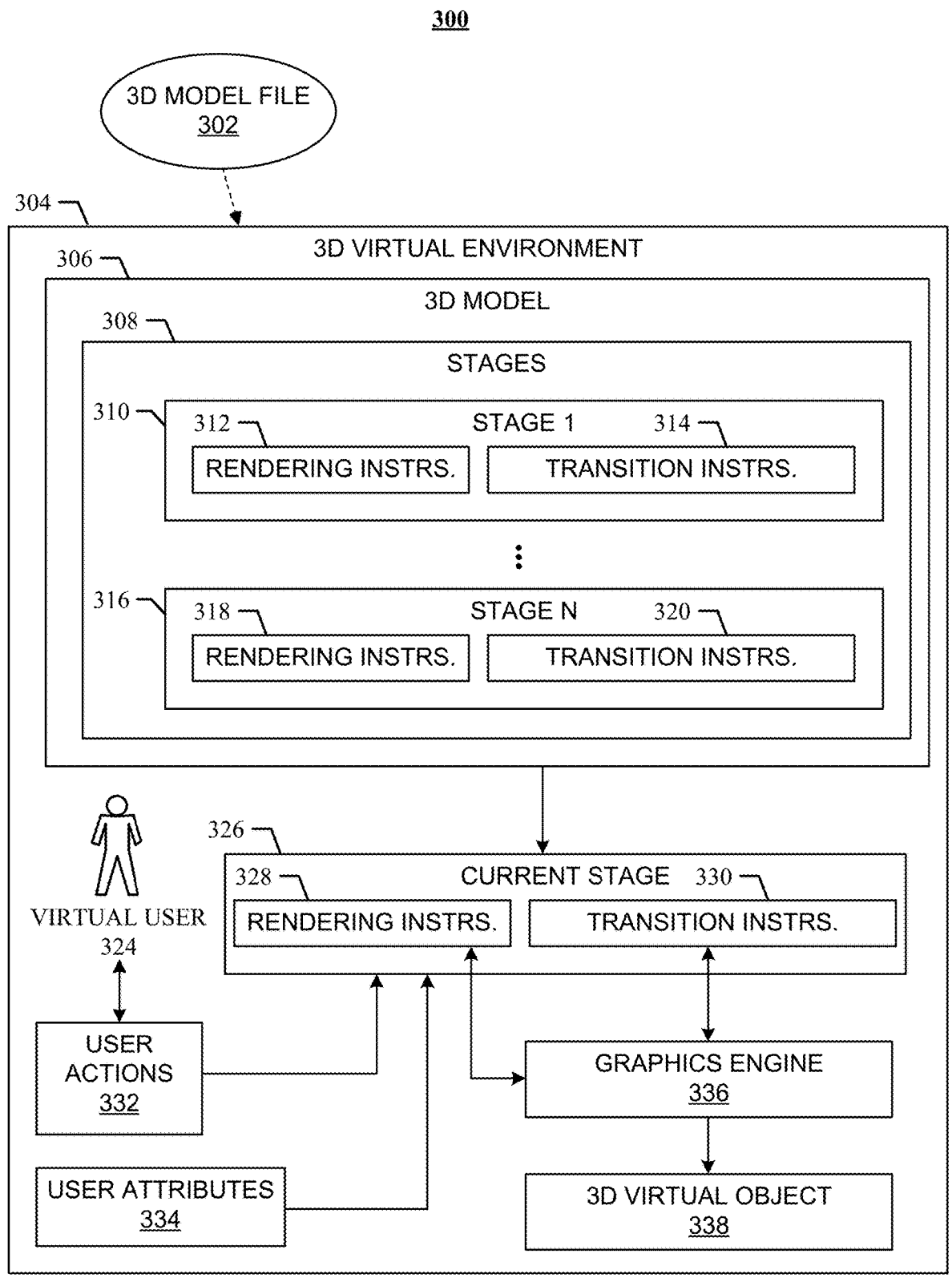
FIG. 3 illustrates an example system for rendering a virtual object in a three-dimensional virtual environment.

FIG. 3 illustrates an example system for rendering a virtual object in a three-dimensional virtual environment. The 3D virtual environment may include a representation of a graphical scene, which may be represented by a scene graph in which objects to be rendered correspond to nodes in a graph data structure. A 3D model file 302 that includes a representation of one or more 3D objects may be provided to the 3D virtual environment 304 for rendering and presentation to a user of the virtual environment 304. A virtual user 304, which represents the actual real-life user (not shown), may be included (e.g., rendered as an object) in the virtual environment 304, and may be controlled by the actual user via a user interface device, so that the actual user perceives the positions of rendered objects in the virtual environment 304 as being relative to the position of the virtual user 324 in the virtual environment 304. The virtual environment 304 may be rendered as a two-dimensional image that appears three-dimensional to the user. The virtual environment 304 may be displayed on a monitor screen or other I/O device of a computer system 800 as described with reference to FIG. 8. The I/O device may be a virtual-reality interface that provides a greater sense of three-dimensional depth than a monitor screen. The virtual-reality interface may also move the virtual user 324 in the virtual environment 304 in response to the actual user's body motion. The 3D model file 302 may be, e.g., a file in a 3D model interchange format such as the COLLADA (COLLAborative Design Activity) format. The 3D model file 302 may be received from a third-party, such as an automobile manufacturer or dealer, or a service provider, or the like. Alternatively, the 3D model file 302, or portions thereof, may be generated by the virtual environment 304 or by an associated component instead of being received from a third party.

In particular embodiments, the virtual environment 304 may generate a 3D model 306 based on the 3D model file 302, e.g., by decoding the file and creating the 3D model 306 as one or more data structures in memory to represent the model specified in the 3D model file 302. The model 306 may include graphics resources, e.g., vector representations of objects, generated from the model file 302. The model 306 may also include control instructions for rendering a 3D virtual object 338 based on the model 306 and in accordance with a course of stages. In particular embodiments, the control instructions may be structured as rendering instructions 312 and transition instructions 314 associated with each stage 310 of the course. There may be one or more stages, ordered starting with an initial "STAGE 1" 310 associated with rendering instructions 312 and transition instructions 314, through a final "STAGE N" 316, which may be associated with rendering instructions 318 and transition instructions 320. The arrangement of instructions into the structure shown in FIG. 3 is described as an example and not by way of limitation. Other arrangements for structuring the control instructions are contemplated, e.g., as one or more sets of instructions that can process all of the stages 308.

In particular embodiments, a particular stage may be selected as a current stage 326, and processing may be performed for the current stage 326. The current stage 326 may be a reference to or a copy of one of the stages 308, and is initially set to "STAGE 1" 310. The transition instructions 314 of the first stage may determine when to update the current stage 326 to a different stage such as "STAGE N" 316.

In particular embodiments, the rendering instructions 312 and the transition instructions 314 may be invoked by a graphics engine 336 that generates a sequence of images (e.g., frames) to be displayed to the user by rendering the objects and their interactions according to the rendering instructions 312 and selected rules of physics. As an example and not by way of limitation, the rendering instructions 312 and transition instructions 314 may be invoked by the graphics engine 336 for each frame being generated. The rendering instructions 312 may determine the location and behavior of the virtual object 338 in the virtual environment 304 using appropriate interface functions of the rendering engine 336. The rendering instructions 312 may then invoke the transition instructions 314 to update the current stage 326 to a different one of the stages 308 if the transition condition for the stage is satisfied.

In particular embodiments, the rendering instructions 328 for the current stage 326 may determine the location, state, and behavior of the virtual object 338 based on user actions 332, user attributes 334, or a combination of both. The transition instructions 330 may evaluate the transition condition associated with the current stage 326 and, if the condition is true, set the current stage to the next stage in the course. At each of the stages 308, the next stage may be identified by the transition instructions 330, e.g., by retrieving the identity of the next stage from a data structure that includes a representation of the links between the stages. However, the transition to the next stage does not necessarily occur, since the transition condition is not necessarily met. For example, if the transition condition involves waiting for the user to look at the virtual object for a threshold period of time, but the user never looks at the virtual object in a particular session of using the virtual environment, then the current stage does not change during that session. Similarly, the user may advance through some but not all of the stages during a particular session. Thus, at each stage, the user's actions determine whether the user advances to a subsequent stage. If the user does not choose to perform an action that satisfies the condition for advancing to a subsequent stage, then the user may remain in the present stage for the entire session. The course of stages thus may correspond to a decision tree, and may have a path from the first stage to the final stage. The user may traverse the path by satisfying the transition conditions of each of the stages (if intermediate stages between the first and final stages are required), or of the stage preceding the final stage (if intermediate stages are optional).

In particular embodiments, the user actions 332 may be actions that occur in the virtual environment 304, e.g., in response to input received from the actual user by an input device. The user actions 332 may include movements, interactions with virtual objects, speaking, writing, responding to questions, posting status updates or comments, sending messages, looking in a particular direction or at a particular virtual object, moving to a different location, and other actions that can be performed in the virtual environment 304 on behalf of the actual user.

In particular embodiments, the user attributes 334 may include the state of the virtual user 324 in the virtual environment 304, such as the location, orientation, velocity, field of view, and other simulated physical characteristics and properties of the virtual user 324. The user attributes 334 may also include information associated with the user by a social-networking system 160, such as a user profile, which may include the user's name, demographic information, and preferences, and friends, location history, ratings of entities, purchase history, interests, and other social-network information.

Figure 4:
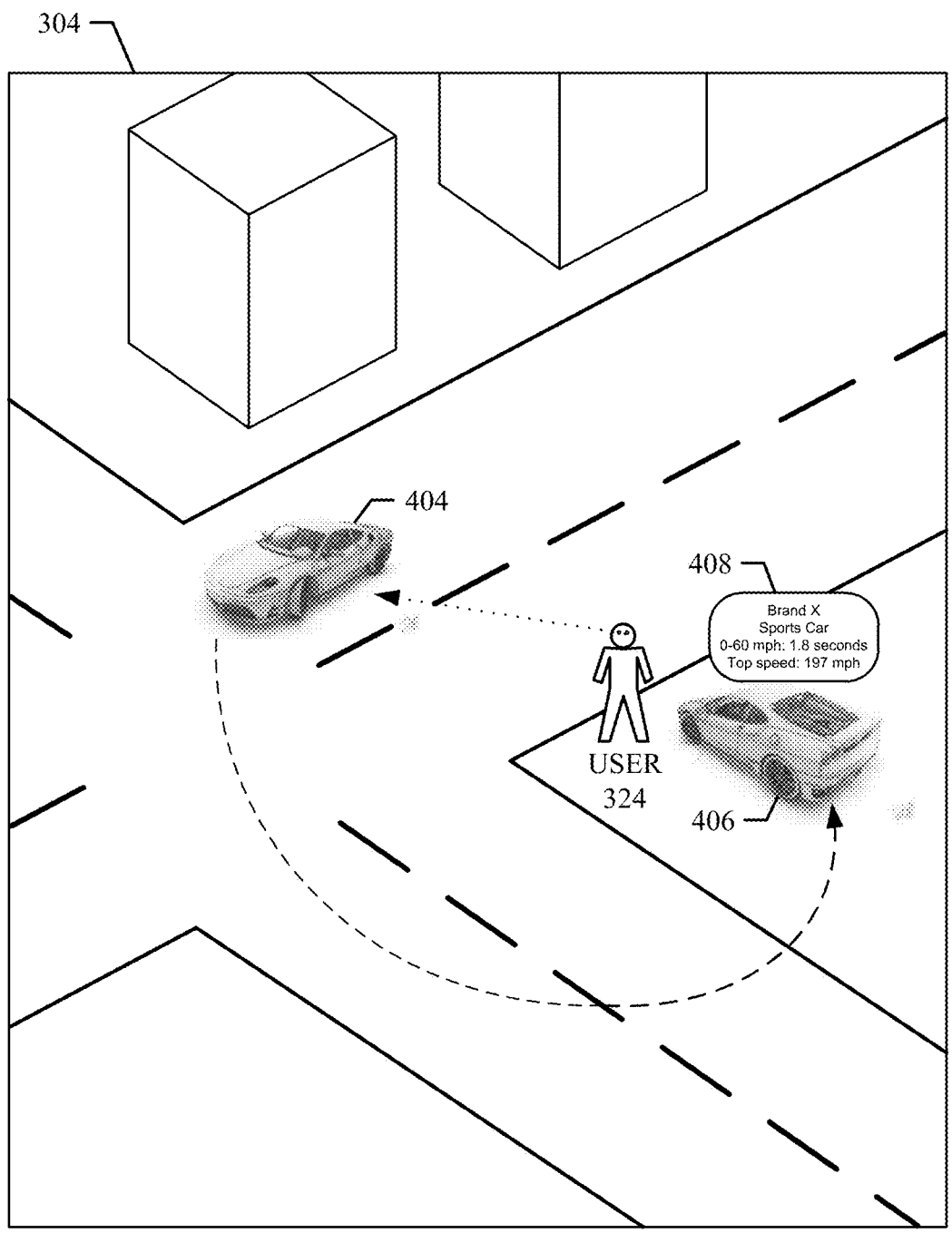
FIG. 4 illustrates an example of a virtual object rendered in a three-dimensional virtual environment.

FIG. 4 illustrates an example of a virtual object 404 rendered in a three-dimensional virtual environment 304. The virtual object 404 in this example represents a sports car and is rendered and controlled in the virtual environment 304 based on a 3D model 306 of a sports car. FIG. 4 shows example interactions between the sports car object 404 and the virtual user 324 that may occur over a period of time. Initially, e.g., at an initial time, the user is associated with an initial stage, and the car object 404 is rendered by rendering instructions associated with the initial stage so, that the car object 404 appears to be moving down a street in the virtual environment 304 in the field of view of the user 324. The rendering instructions associated with the initial stage may move the car along virtual streets near, e.g., the virtual user 324, according to a default path or pattern, such as moving around the perimeter of one or more virtual city blocks in a rectangular pattern. The car object 404 may be perceived by the actual user, as if the actual user were looking through the eyes of the virtual user 324 based on the location and orientation of the virtual user and the orientation of the virtual user's head. In this example, by looking at the car object 404 for at least a threshold period of time, e.g., 3 seconds or other appropriate time, the user shows interest in the car object 404. The user may show interest in the car object 404 in other ways, e.g., by requesting information about the car object 404 or making a virtual gesture toward the car object 404. The transition instructions associated with the initial stage may determine that the transition condition is satisfied by the user's looking at the car object 404, and may update the current stage associated with the user to a second stage.

In particular embodiments, the second stage may have rendering instructions that move the car object 404 toward the location of the virtual user 324, e.g., to provide further information about the virtual object 404 to the user. For example, the car object 404 may be moved along a path shown by a dashed are to a location closer to the user 324, as shown by a repositioned car object 406. The rendering instructions for the second stage may also provide information 408 about the car object 406. The information 406 may describe the car's brand ("Brand X"), model or type ("Sports Car"), and may list details about the car, such as an acceleration time and a top speed. The rendered information 408 may be visible to the user 324 in the virtual environment 304. There may be additional stages to provide further information about the virtual car object 406 to the user, such as details of the car's performance features, safety features, construction, size, available colors and options, cost, and the like. A test drive may be offered to the virtual user 324, so that the user 324 may sit in and experience a simulation of driving the car object 406 on streets or tracks in the virtual environment 304. Any number of stages may be defined and used to present the rendered object and related information to the user 324, until a final stage is reached in which the user acquires, uses, or purchases the object, or the user indicates a lack of interest in the virtual car object 406.

Figure 5:
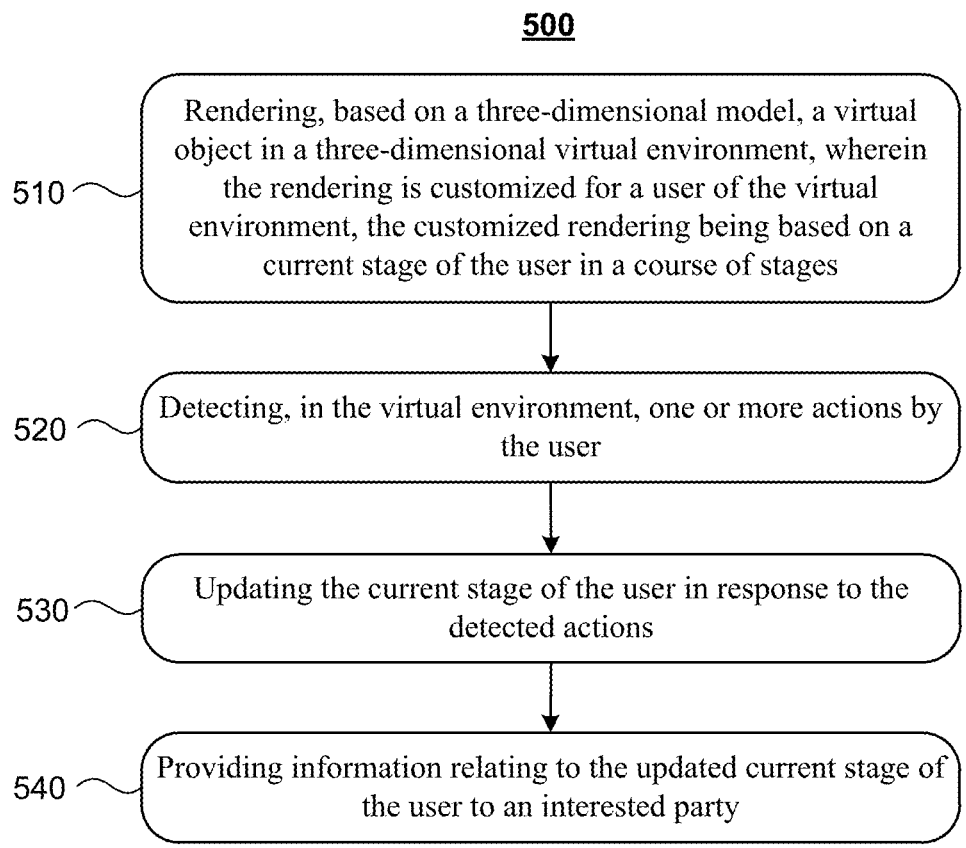
FIG. 5 illustrates an example method for rendering a virtual object in accordance with a course of stages in a three-dimensional virtual environment.

FIG. 5 illustrates an example method 500 for rendering a virtual object in accordance with a course of stages in a three-dimensional virtual environment. The method may begin at step 510, where the social-networking system 160 may render, based on a three-dimensional model, a virtual object in a three-dimensional virtual environment, wherein the rendering may be customized for a user of the virtual environment, the customized rendering being based on a current stage of the user in a course of stages. At step 520, the social-networking system 160 may detect, in the virtual environment, one or more actions by the user. At step 530, the social-networking system 160 may update the current stage of the user in response to the detected actions. At step 540, the social-networking system 160 may provide information relating to the updated current stage of the user to an interested party.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for rendering a virtual object including the particular steps of the method of FIG. 5, this disclosure contemplates any suitable method for rendering a virtual object including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
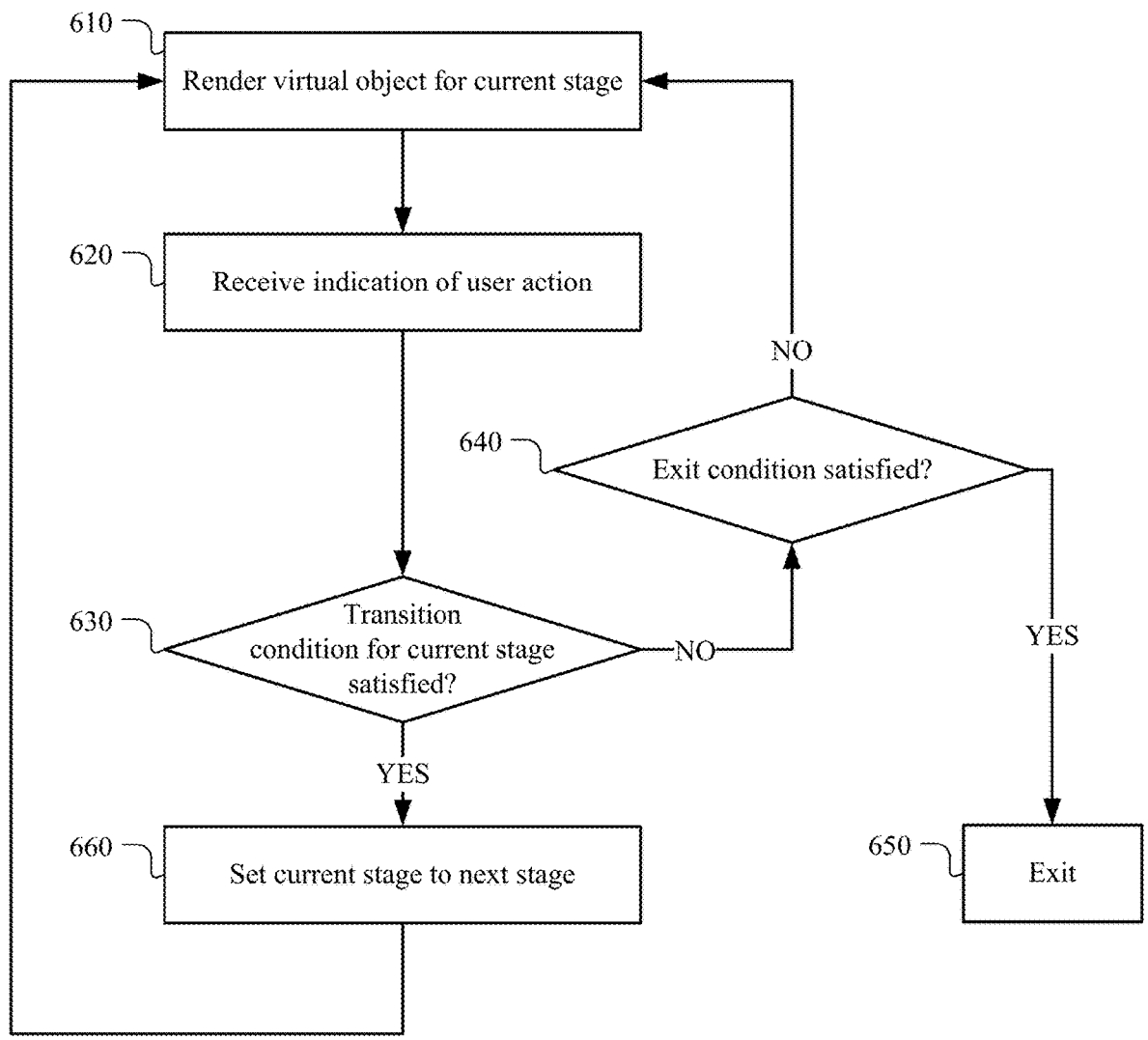
FIG. 6 illustrates an example method for rendering a virtual object for each stage in a course of stages.

FIG. 6 illustrates an example method 600 for rendering a virtual object for each stage in a course of stages. The method may begin at step 610, where the social-networking system 160 may render a virtual object for the current stage in a course of stages. At step 620, the social-networking system 160 may receive an indication of a user action. The indication may be received when the user has performed an action, which may occur as a result of user input from an input device. As an example and not by way of limitation, an indication may be received for each action, e.g., each interaction, movement, communication, or other action performed on behalf of the user in the virtual environment. At step 630, the social-networking system 160 may determine whether at least one transition condition associated with the current stage is satisfied. This determination may be made by transition instructions associated with the current stage.

In particular embodiments, if a user action indicates that the user fits in a "higher" stage than the current stage, then the current stage may be advanced to the highest stage in which the user fits. That is, at step 630, the social-networking system 160 may determine whether any of the transition conditions associated with any of the stages in the course are satisfied, and, if so, advance the current stage to the stage after the "highest" stage (e.g., to the stage closest to the final stage) for which a transition condition is satisfied. For example, if the current stage is an "awareness" stage indicating the user is aware of the virtual object, and the user indicates a preference for the virtual object, then the user has satisfied the transition condition for moving to the next stage after the "preference" stage, and need not pass through each of the stages prior to the "preference" stage. Such an action may be, e.g., the user referring to the virtual object with preferential language in a post, comment or message. If this action is detected in any stage prior to the preference stage, then the current stage may be advanced to the next stage after the preference stage, since the conditions for exiting the preference stage have been met.

At step 640, the social-networking system 160 may determine whether an exit condition is satisfied. The exit condition may be a condition that, based on a user action, determines whether to exit the process of FIG. 6. For example, the exit condition may be satisfied when the user provides input indicating that he or she is not interested in the virtual object. As another example, the exit condition may be satisfied when the user indicates that he or she does not want to see any information related to the virtual object, or does not want to see the virtual object in the virtual environment. Although the exit condition is evaluated subsequent to the transition condition in FIG. 6, the exit condition may be evaluated at one or more other points in the process 600. If the exit condition is satisfied, the method 600 exits at step 650. If the exit condition is not satisfied, the method 600 proceeds to step 660. At step 660, the social-networking system 160 may update the current stage indicator by setting the current stage to refer to the next stage in the course. The next stage may be identified by the transition instructions.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for rendering a virtual object for each stage in a course of stages including the particular steps of the method of FIG. 6, this disclosure contemplates any suitable method for rendering a virtual object for each stage in a course of stages including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7A:
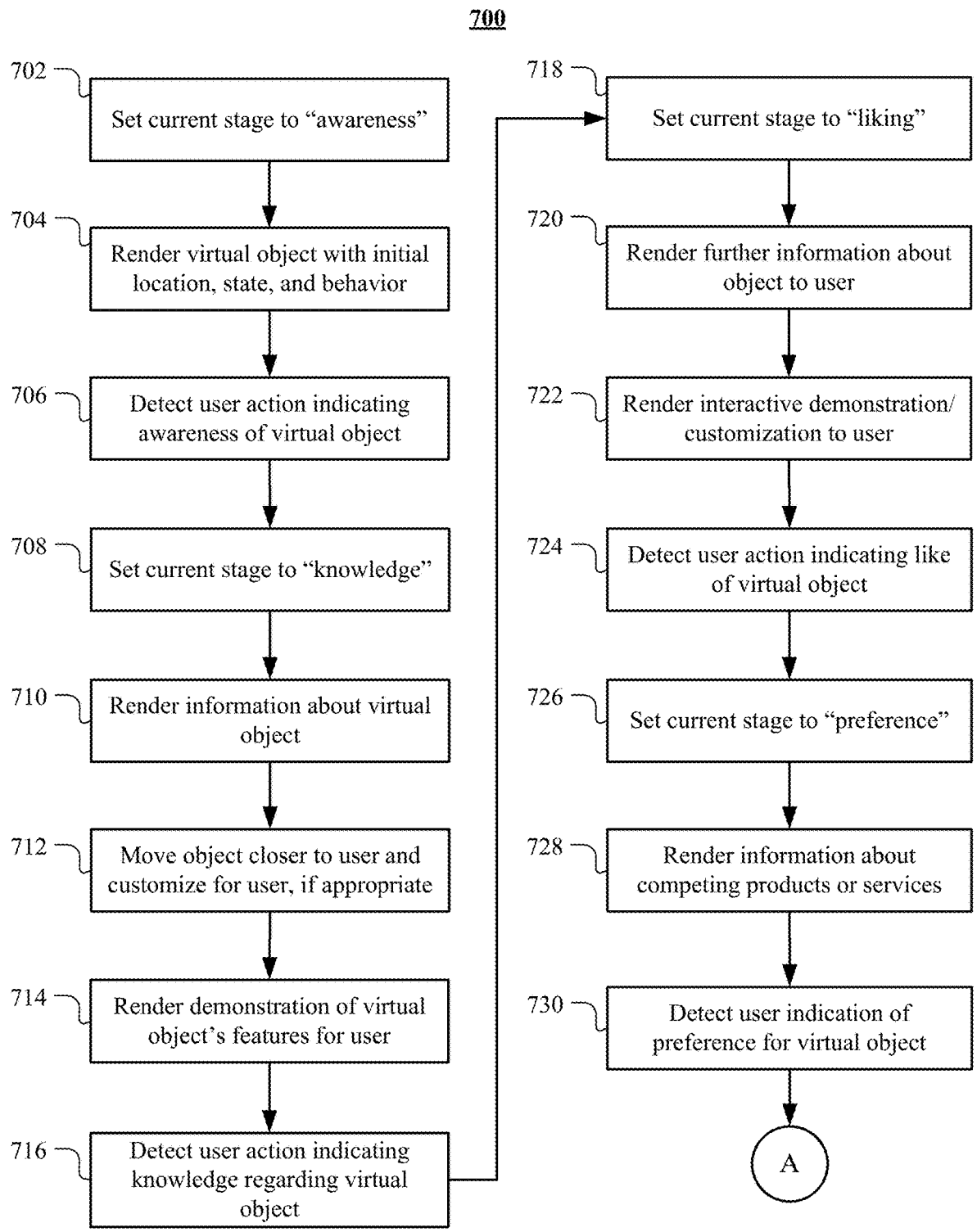
FIGS. 7A and 7B illustrate an example method for rendering a virtual object in a course of stages.
Figure 7B:
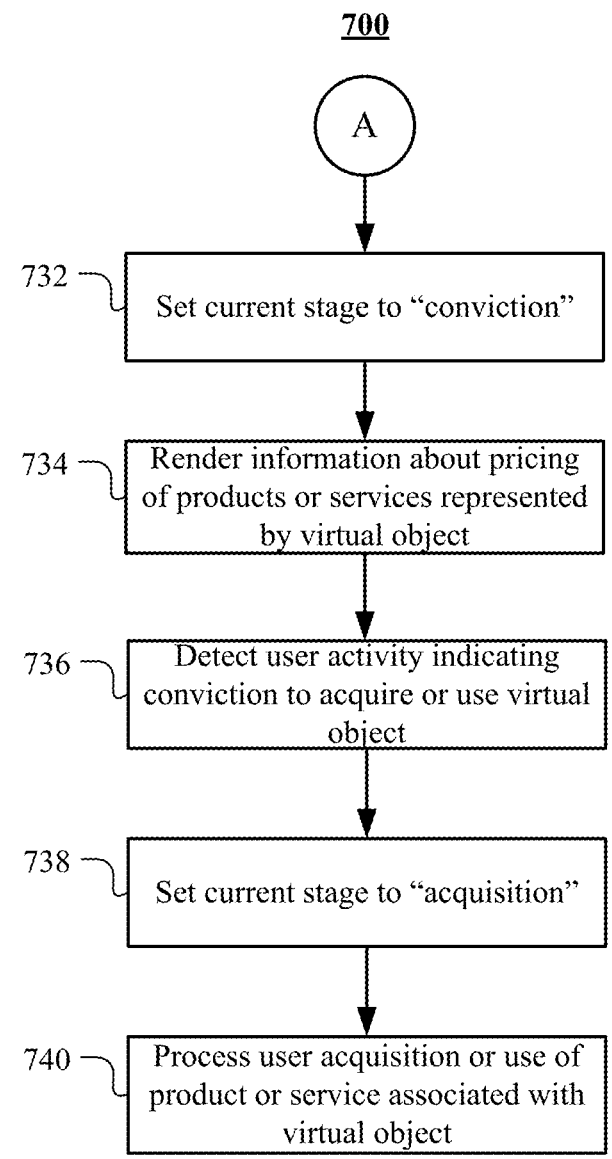

FIGS. 7A and 7B illustrate an example method 700 for rendering a virtual object for a user in a course of stages. The method may begin at step 702 where the social-networking system 160 may set the current stage indicator to an "awareness" stage, in which the user is made aware of the virtual object. The "awareness" stage may end when the user performs an action indicating they are aware of the virtual object, as described below with reference to step 706. In the "awareness" stage, the virtual object may have a "default" appearance and behavior that correspond to the appearance and behavior of a real-world object of the type represented by the virtual model. In this default mode, the virtual object does not interact with the user unless the user initiates the interaction or the virtual object is located near the virtual user in the virtual environment (e.g., within less than a threshold distance, such as 10, 100, or 500 virtual feet). If the user initiates an interaction, the process 700 may move to the next stage, as described below.

At step 704, the social-networking system 160 may render the virtual object as appropriate for the awareness stage. For example, the virtual object may be rendered at an initial location in the virtual environment, with a specified state and behavior. The object's location may be a location in the user's field of view. The object may be rendered at a location near the user in the virtual environment, but the location and behavior of the object should be appropriate for the type of object. For example, a virtual car object may be shown driving on a street, and a virtual hair style may be shown on a virtual person or a in a virtual picture at a hair salon.

If the object is located near the user, then the appearance (and/or sound, if appropriate) of the object may be modified to emphasize the object, e.g., by rendering the object in a brighter color, at a larger size, with a louder sound, with more detail, with additional features based on the user's interests, or the like. For example, a virtual car object's default appearance may be a rendering of the car with no optional features, as the car would appear in the real world according to the virtual model. The virtual car object's default behavior may be driving on the streets of the virtual environment, or remaining in a stationary parked location. That is, the virtual car object may behave and appear similar to a car in the real world.

Since the method 700 may be invoked for each rendered frame, each location in the user's field of view can be evaluated as a candidate location for the virtual object. Additional conditions may be evaluated to determine whether to render the virtual object at a candidate location. For example, the virtual object may be placed at locations in the virtual environment that are appropriate for the object's type. A virtual car object may be placed on a street or parking lot, for example. The virtual car object may be rendered driving on virtual streets within the virtual user's field of view, thereby having behavior that corresponds to the type of object (since cars ordinarily drive on streets). The virtual car object may continue to drive on the virtual streets, e.g., according to a route that periodically brings the object into the user's field of view, at least until the user indicates an awareness of the object, e.g., by looking toward the object, interacting with the object, or referencing the object (e.g., posting a status update containing the name of the object), at which point the method 700 moves to the next stage, as described below.

As another example, a virtual hair style may be placed on an advertisement at a location appropriate for advertisements, such as a billboard or simulated video screen. The virtual hair style may also be placed at a location appropriate for hair styles, such as a sign at a virtual hair salon, or on a virtual person. Other types of virtual objects may similarly be placed at locations appropriate to those types so that the virtual objects do not appear out of place, and maintain a sense of realism in the virtual environment. The virtual objects may remain in position, and move if appropriate for the type of object, at least until the user indicates an awareness of the object, at which point the method 700 moves the next stage.

At step 706, the social-networking system 160 may detect a user action that indicates the user is aware of the virtual object, such as the user looking directly at the object for at least a threshold period of time, e.g., 2 second, 4 second, or the like, or the user pointing toward the object or requesting information about the object. Other user actions that may indicate the user is aware of the virtual object include the user using a "like" feature of the social-networking system 160 to indicate that the user likes the virtual object, an entity that represents the virtual object, or an article or post that mentions or otherwise references the virtual object. Still other actions that may indicate the user is aware of the virtual object may include the user posting a positive message, comment, or review of the virtual object, requesting pricing information for the virtual object, recommending the virtual object to another user, and the like. When a user action indicating awareness of the virtual object is detected, the process 700 may move on to the next stage.

In particular embodiments, as described above with reference to step 630 of FIG. 6, any of the user actions indicating awareness in step 706 may also be detected at other steps of the process 700, such as steps 716, and 724, that detect user action and move the process on to the corresponding next stage, e.g., to step 718 from step 716. In particular embodiments, the process 700 need not perform steps of the process that are prior to a step for which the transition condition is satisfied. For example, if the transition condition for exiting the "preference" stage is satisfied while the current stage is "awareness", then the current stage may be advanced to the stage following the "preference" stage, e.g., by executing stage 732 to advance to the "conviction" stage. In particular embodiments, the transition condition of each stage may be evaluated whenever one of the transition conditions is evaluated by the method 700, and execution may be transferred to a step that corresponds to the stage after the highest stage for which a transition condition is satisfied.

At step 708, the social-networking system 160 may set the current stage to the "knowledge" stage. In the "knowledge" stage, the user may acquire knowledge about the virtual object, such as details of the object's features. The "knowledge" stage may end when the user performs an action indicating they are knowledgeable about the object. In the "knowledge" stage, information may be presented to the user to increase the user's knowledge of the virtual object's features. In particular embodiments, the quantity and/or level of detail of information presented to the user in each stage may be greater and/or more detailed than information presented to the user in the previous stage.

At step 710, the social-networking system 160 may provide the user with information about the virtual object, e.g., by rendering the information on or near the virtual object. FIG. 4 shows example information 408, which includes performance information about the sports car virtual object 406. Information may be provided to the user in other ways, e.g., by moving the virtual object closer to the user, so that the user can view the object in more detail (step 712), and/or rendering a demonstration of the virtual object's features for the user (step 714). A demonstration may include, for example, showing the object's behavior, such as a car driving on a test track, or a hair style on a virtual person and/or on the virtual user. The particular behavior or features demonstrated may be selected based on the user's interests or by querying the user about which type of behavior or features he or she wishes to see. For example, if the user's interests include topics related to luxury cars, then luxury-oriented features of the car may be demonstrated and/or presented to the user, such as luxurious interior materials, comfort-oriented features, such as smooth, quiet ride provided by a luxury-oriented suspension. As another example, if the user's interests include topics related to sports cars, then high-performance features of the car may be demonstrated and/or presented, such as a manual transmission and firmer suspension. The "knowledge" stage may continue until the user performs an action indicating knowledge regarding the virtual object.

At step 716, the social-networking system 160 may detect a user action indicating knowledge regarding the virtual object. Such an action may be, for example, the user looking at or reading information related to the virtual object (such as a review of the object), requesting additional information about the object, or posting a comment or question regarding the object. These actions are merely examples, and other actions indicating knowledge of the object are contemplated. When such an action has been detected, the process 700 may move on to the next stage.

At step 718, the social-networking system 160 may set the current stage to "liking." In the "liking" stage, the user may begin to like, e.g., find the virtual object agreeable (if he or she does not already). The "liking" stage may end when the user performs an action indicating they like the object. In the "liking" stage, additional information about the object, longer or more detailed demonstrations, or the like, may be presented to the user. This additional information may be presented when the process 700 reaches step 720, and, if the user does not indicate liking of the virtual object after step 720, then step 722 may be performed, or the process 700 may wait for a period of time, e.g., 1 hour, 24 hours, 1 week, or the like, before presenting additional information. Additional information may be presented by, e.g., repeating step 720, or executing step 722 to render an interactive demonstration or trial to the user. That is, the rate at which information is presented to the user may be limited to avoid overwhelming or annoying the user. The rate may be increased using an exponential back-off timer, e.g., by increasing the delay exponentially with the number of times information about the object is presented to a particular user. If the delay becomes sufficiently long, e.g., greater than a threshold time such as 1 week, 1 month, 3 months, 1 year, and the like, then the current stage may be reverted back to an earlier stage such as the "knowledge" stage (at step 708) or the "attention" stage (at step 702. In this way, the user's memory may be refreshed after the threshold period of time, or the quantity/and or level of detail of information presented to the user may be reduced to avoid overloading or annoying the user. Similarly, a delay may be introduced between presenting two different types of information at any stage of the process 700. For example, a delay may be introduced between steps 710 and 712, steps 712 and 714, and/or between steps 720 and 722. The exponential time delay and reverting to earlier stages may be performed between any such repeated presentations of information, whether between two different steps of the process 700, or within the same step, e.g., when multiple different items of information are presented in one of the steps.

As an example of rendering further information at step 720, more details about options that are available for the car, and/or more detailed performance specifications may be presented to the user. At step 720, the appearance of the virtual model may be changed to show the different options available, such as different colors, wheels, and/or different models or types of cars available from the manufacturer or dealer associated with the virtual model on which the virtual object is based. As another example, further details about the object, such as safety ratings, fuel economy, pricing, and the like may be displayed in the information display 408 shown near the object 406 in FIG. 4.

At step 722, the social-networking system 160 may render a demonstration or customization of the virtual object, such as an interactive demonstration in which the user may control or modify the virtual object. For example, a test drive of the virtual car object may be offered to the user, and, if the user accepts, a driving simulation in which the user drives the car through the virtual environment may be provided to the user. As another example, the user may customize the configuration or appearance of the virtual car object, in which case the virtual car object may be rendered in the customized configuration or appearance, e.g., in a different color or with a different body style.

At step 724, the social-networking system 160 may detect a user action indicating that the user likes the virtual object. This user action may be, e.g., the user using a "like" feature of the social-networking system 160 to indicate that the user likes the virtual object, an entity that represents the virtual object, or an article or post that mentions or otherwise references the virtual object. Other actions that may indicate the user likes the virtual object may include the user posting a positive message, comment, or review of the virtual object, requesting pricing information for the virtual object, recommending the virtual object to another user, and the like. Upon detecting that the user likes the virtual object, the process 700 may move on to the next stage.

At step 726, the social-networking system 160 may set the current stage to "preference." In the "preference" stage, the user may begin to prefer the virtual object over other similar objects, such as other sports cars. The "preference" stage may end when the user performs an action indicating they prefer the virtual object. As an example and not by way of limitation, the transition condition in the preference stage may be satisfied when an indication is received from the user indicating that the user prefers the product or service to at least one other product or service. At step 728, the social-networking system 160 may render information about competing products or services to assist the user in determining whether he or she prefers the virtual object over other objects, such as objects available from other sources or vendors.

At step 730, the social-networking system 160 may detect a user indication of preference for the virtual object. The user may indicate a preference for the virtual object by, e.g., by adding the virtual object to a virtual shopping cart, marking the virtual object as a "favorite" object in the online-social networking system, referring to the virtual object with preferential language in a post, comment or message, e.g., posting a status update with text "My favorite car is the Brand X Sports Car."

In particular embodiments, the social-networking system 160 may execute step 732 of FIG. 7B after step 730 of FIG. 7A as shown by control point A. Step 732 may set the current stage to "conviction." In the "conviction" stage, the user may become convinced that he or she prefers the virtual object over other similar objects, such as other sports cars. The "conviction" stage may end when an activity indicating the user has a conviction to acquire or otherwise use the virtual object at step 736.

At step 734, the social-networking system 160 may render information about pricing of the virtual object, such as a price at which the virtual object can be purchases in the virtual environment, e.g., so that the virtual user may gain access to, rent, or own the virtual model or a related virtual object, such as a virtual model of a sports car or of a hair style. The user may then use the acquired virtual models in the virtual environment. As another example, the pricing information may include a price at which the user may gain access to, rent, or own a real-world object or service represented by the virtual object, such as a sports car from a car dealer or a hair-styling service at a hair salon. The user may then use the acquired real-world objects in the real world.

At step 736, the social-networking system 160 may detect user activity indicating conviction to acquire or otherwise use the virtual object. In particular embodiments, the action indicating conviction may be, e.g., requesting pricing information, providing payment, or other similar activity. The user may initiate a purchase, for example, selecting a purchase option to purchase the object in the virtual environment, or selecting another type of acquisition object, such as a loan option to use the object for a period of time without paying for the object, or a rent option to use the object for a period of time while paying for the object.

At stop 738, the social-networking system 160 may set the current stage to "acquisition." In the "acquisition" stage, the user may decide to purchase or otherwise acquire (e.g., rent, borrow, or the like) the object. At step 740, the social-networking system 160 may process the user's acquisition or use of the virtual object or a product or service associated with virtual object, e.g., process a payment by the user for the virtual object.

Particular embodiments may repeat one or more steps of the method of FIGS. 7A and 7B, where appropriate. Although this disclosure describes and illustrates particular steps of the method of FIGS. 7A and 7B as occurring in a particular order, this disclosure contemplates any suitable steps of the method of FIGS. 7A and 7B occurring in any suitable order. Moreover, although this disclosure describes and illustrates an example method for rendering a virtual object for a user in a course of stages including the particular steps of the method of FIGS. 7A and 7B, this disclosure contemplates any suitable method for rendering a virtual object for a user in a course of stages including any suitable steps, which may include all, some, or none of the steps of the method of FIGS. 7A and 7B, where appropriate. Furthermore, although this disclosure describes and illustrates particular components, devices, or systems carrying out particular steps of the method of FIGS. 7A and 7B, this disclosure contemplates any suitable combination of any suitable components, devices, or systems carrying out any suitable steps of the method of FIGS. 7A and 7B.

Systems and Methods

Figure 8:
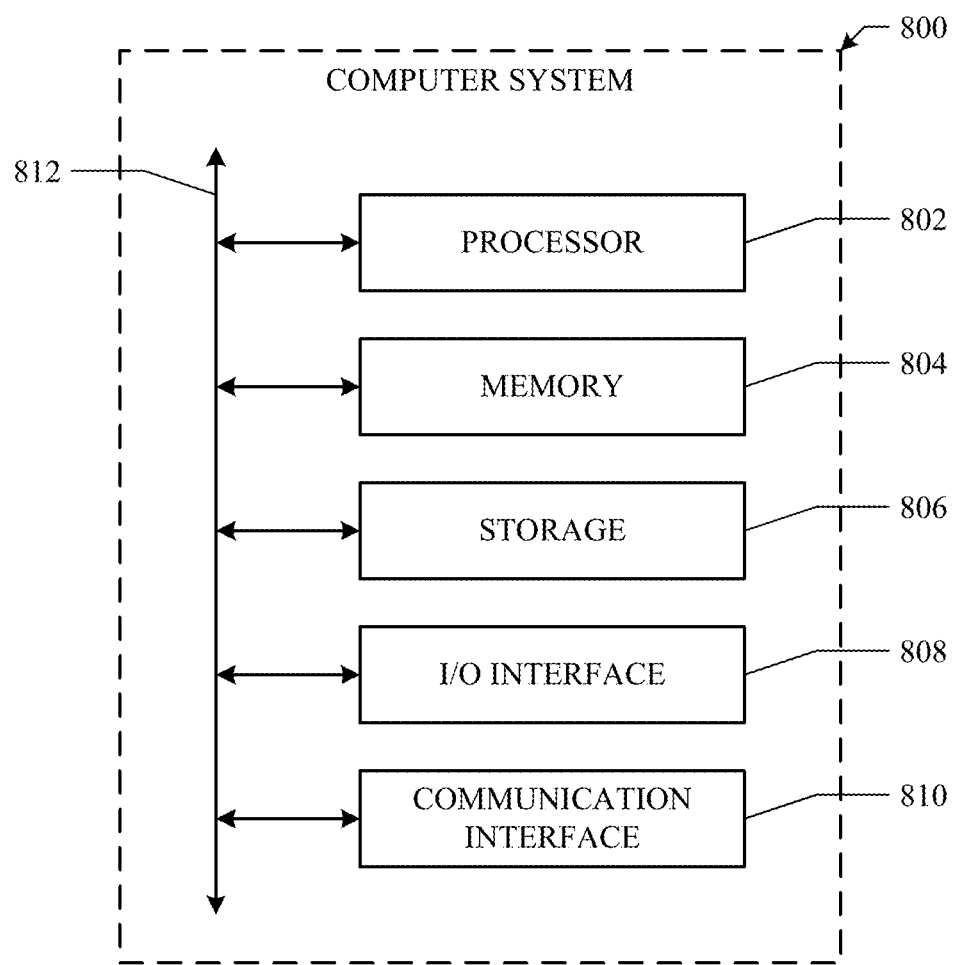
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, determining a current location of a virtual user corresponding to a user of a social network in a three-dimensional virtual environment, wherein the virtual environment comprises the virtual user representing the user and a virtual object, wherein a rendering of the virtual object is transient and customized for the user, wherein the customized rendering is based on a current stage of the user in a course of stages and based on one or more posts or comments made by the user in relation to the virtual object or a topic related to the virtual object, and wherein a first stage is the current stage;
    by the computing device, determining a first position for the virtual object based on the first stage, wherein the first position is in a field of view of the virtual user in the virtual environment;
    by the computing device, rendering the virtual object at the determined first position in the virtual environment based on rendering instructions associated with the first stage, wherein the rendering instructions comprise rendering parameters associated with the virtual object, and wherein the rendering parameters depend on a distance between the current location of the virtual user and the determined first position for the virtual object;
    by the computing device, determining that one or more of transition conditions to update the current stage to a second stage are satisfied; and
    by the computing device, rendering the virtual object at a second position based on rendering instructions associated with the second stage, wherein a distance between the virtual object and the virtual user representing the user in the virtual environment is changed.

2. The method of claim 1, wherein the determining the first position for the virtual object comprises:
    identifying one or more candidate positions for the virtual object, wherein the one or more candidate positions are identified based on a type of the virtual object; and
    selecting a position for the virtual object from the one or more candidate positions based on the first stage, wherein the selected position is appropriate for the type of the virtual object.

3. The method of claim 1, wherein the rendering parameters are customized based on the current stage.

4. The method of claim 1, wherein the rendering parameters comprise an appearance of the virtual object, and a behavior of the virtual object.

5. The method of claim 4, wherein the appearance of the virtual object is modified to emphasize the virtual object if the distance is within a threshold distance.

6. The method of claim 5, wherein the virtual object is rendered in a particular color, wherein the particular color is more noticeable than a color of the virtual object rendered when the distance exceeds the threshold distance.

7. The method of claim 5, wherein the virtual object is rendered at a larger size compared to the virtual object rendered when the distance exceeds the threshold distance.

8. The method of claim 5, wherein the virtual object is rendered with additional details than the virtual object rendered when the distance exceeds the threshold distance.

9. The method of claim 5, wherein the virtual object is rendered with one or more additional features based on the user's interest.

10. The method of claim 4, wherein the behavior of the virtual object depends on the determined position for the virtual object.

11. The method of claim 4, wherein the behavior of the virtual object depends on the appearance of the virtual object.

12. The method of claim 1, wherein the second stage is determined based on a detected user input.

13. The method of claim 1, wherein the stages comprise awareness, knowledge, liking, preference, conviction, or acquisition.

14. The method of claim 1, wherein the transition conditions depend on the current stage.

15. The method of claim 1, wherein the determining one or more of the transition conditions are satisfied comprises detecting a request from the user to purchase, rent, borrow, or use a product or service represented by the virtual object.

16. The method of claim 1, wherein the determining one or more of the transition conditions are satisfied comprises detecting an interaction by the user with the virtual object, wherein the interaction comprises an affirmative detectable motion by the user.

17. The method of claim 16, wherein the affirmative detectable motion comprises the user turning head toward the virtual object, following the virtual object with eyes, pointing toward the virtual object, reaching toward the virtual object, walking toward the virtual object, touching the virtual object, or operating a feature of the virtual object.

18. One or more computer-readable non-transitory storage media embodying software that is operable when executed to:
- determine a current location of a virtual user corresponding to a user of a social network in a three-dimensional virtual environment, wherein the virtual environment comprises the virtual user representing the user and a virtual object, wherein a rendering of the virtual object is transient and customized for the user, wherein the customized rendering is based on a current stage of the user in a course of stages and based on one or more posts or comments made by the user in relation to the virtual object or a topic related to the virtual object, and wherein a first stage is the current stage;
- determine a position for the virtual object based on the first stage, wherein the position is in a field of view of the virtual user in the virtual environment;
- render the virtual object at the determined position in the virtual environment based on rendering instructions associated with the first stage, wherein the rendering instructions comprise rendering parameters associated with the virtual object, and wherein the rendering parameters depend on a distance between the current location of the virtual user and the determined position for the virtual object; and
- determine that one or more of transition conditions to update the current stage to a second stage are satisfied; and
- render the virtual object at a second position based on rendering instructions associated with the second stage, wherein a distance between the virtual object and the virtual user representing the user in the virtual environment is changed.

19. A system comprising: one or more processors; and a memory coupled to the processors comprising instructions executable by the processors, the processors being operable when executing the instructions to:
- determine a current location of a virtual user corresponding to a user of a social network in a three-dimensional virtual environment, wherein the virtual environment comprises the virtual user representing the user and a virtual object, wherein a rendering of the virtual object is transient and customized for the user, wherein the customized rendering is based on a current stage of the user in a course of stages and based on one or more posts or comments made by the user in relation to the virtual object or a topic related to the virtual object, and wherein a first stage is the current stage;
- determine a position for the virtual object based on the first stage, wherein the position is in a field of view of the virtual user in the virtual environment;
- render the virtual object at the determined position in the virtual environment based on rendering instructions associated with the first stage, wherein the rendering instructions comprise rendering parameters associated with the virtual object, and wherein the rendering parameters depend on a distance between the current location of the virtual user and the determined position for the virtual object;
- determine that one or more of transition conditions to update the current stage to a second stage are satisfied; and
- render the virtual object at a second position based on rendering instructions associated with the second stage, wherein a distance between the virtual object and the virtual user representing the user in the virtual environment is changed.

* * * * *